United States Patent
Pérez Millán et al.

(10) Patent No.: US 11,563,299 B2
(45) Date of Patent: Jan. 24, 2023

(54) ALL-FIBER CONFIGURATION SYSTEM AND METHOD FOR GENERATING TEMPORALLY COHERENT SUPERCONTINUUM PULSED EMISSION

(71) Applicant: FYLA LASER, S.L., Valencia (ES)

(72) Inventors: Pere Pérez Millán, Paterna (ES); Salvador Torres Peiró, Paterna (ES); Héctor Muñoz Marco, Paterna (ES)

(73) Assignee: FYLA LASER, S.L., Paterna (ES)

( * ) Notice: Subject to any disclaimer, the term of this patent is extended or adjusted under 35 U.S.C. 154(b) by 214 days.

(21) Appl. No.: 16/854,119

(22) Filed: Apr. 21, 2020

(65) Prior Publication Data
US 2020/0343681 A1    Oct. 29, 2020

(30) Foreign Application Priority Data
Apr. 25, 2019 (EP) .................................. 19382313

(51) Int. Cl.
*H01S 3/10* (2006.01)
*H01S 3/094* (2006.01)
(Continued)

(52) U.S. Cl.
CPC ........ *H01S 3/10023* (2013.01); *G02F 1/3528* (2021.01); *H01S 3/0057* (2013.01);
(Continued)

(58) Field of Classification Search
CPC .. H01S 3/0092; H01S 3/0057; H01S 2301/08; G02F 1/3528
See application file for complete search history.

(56) References Cited

U.S. PATENT DOCUMENTS

| | | | | |
|---|---|---|---|---|
| 5,862,287 A | * | 1/1999 | Stock | G02B 6/29394 385/123 |
| 5,880,877 A | * | 3/1999 | Fermann | H01S 3/302 359/341.31 |

(Continued)

FOREIGN PATENT DOCUMENTS

| | | | | |
|---|---|---|---|---|
| CN | 104737390 A | * | 6/2015 | G02F 1/365 |
| EP | 2924500 A1 | * | 9/2015 | G02F 1/39 |
| JP | 2017504074 A | * | 2/2017 | |

OTHER PUBLICATIONS

Klimczak et al., "Direct Comparison of Shot-to-Shot Noise Performance of All Normal Dispersion and Anomalous Dispersion Supercontinuum Pumped with Sub-Picosecond Pulse Fiber-Based Laser", Jan. 13, 2016, Nature, Scientific Reports, 6, 19284, 1-14. (Year: 2016).*

(Continued)

*Primary Examiner* — Joshua King
(74) *Attorney, Agent, or Firm* — Maier & Maier, PLLC

(57) ABSTRACT

An all-fiber configuration system and method for generating temporally coherent supercontinuum pulsed emission are provided. The system includes a sequential structure of all-fiber sections including: a fiber laser seed source to produce a seed pulse with given optical properties; a stretching section including an optical fiber to temporally stretch the seed pulse; an amplification section including an active optical fiber, doped with a rare earth element, to amplify the stretched pulse by progressively stimulating radiation of active ions of the doped active optical fiber; a compressing section to temporally compress the amplified pulse; and a spectrum broadening section including an ANDi microstructured fiber that spectrally broadens the compressed pulse by a nonlinear effect of Self Phase Modulation (SPM) while maintaining the temporal coherence of the pulse.

19 Claims, 11 Drawing Sheets

(51) Int. Cl.
*H01S 3/0941* (2006.01)
*H01S 3/16* (2006.01)
*H01S 3/00* (2006.01)
*H01S 3/23* (2006.01)
*G02F 1/35* (2006.01)

(52) U.S. Cl.
CPC ........ *H01S 3/0092* (2013.01); *H01S 3/09415* (2013.01); *H01S 3/094003* (2013.01); *H01S 3/094038* (2013.01); *H01S 3/094042* (2013.01); *H01S 3/1618* (2013.01); *H01S 3/2308* (2013.01); *H01S 2301/08* (2013.01)

(56) References Cited

U.S. PATENT DOCUMENTS

| | | | |
|---|---|---|---|
| 6,236,779 B1* | 5/2001 | Kafka | B82Y 20/00 359/330 |
| 6,249,630 B1* | 6/2001 | Stock | H01S 3/0057 385/123 |
| 7,486,436 B1* | 2/2009 | Kuksenkov | H01S 3/0057 359/333 |
| 7,826,499 B2* | 11/2010 | Nicholson | G02F 1/365 372/6 |
| 8,275,010 B2* | 9/2012 | Oguri | H01S 3/06754 372/25 |
| 8,718,104 B2* | 5/2014 | Clowes | H01S 3/11 372/21 |
| 8,971,358 B2 | 3/2015 | Fermann et al. | |
| 9,341,920 B1* | 5/2016 | Reed | G02F 1/39 |
| 9,553,421 B2 | 1/2017 | Fermann | |
| 9,590,381 B2 | 3/2017 | Hideur et al. | |
| 9,601,899 B2* | 3/2017 | Salem | G02B 21/0032 |
| 9,825,419 B2 | 11/2017 | Hori et al. | |
| 9,835,795 B2* | 12/2017 | Thomsen | G02B 6/02214 |
| 9,841,557 B2* | 12/2017 | Johansen | G02B 6/255 |
| 9,958,606 B2* | 5/2018 | Thomsen | G02B 6/02376 |
| 9,986,904 B2 | 6/2018 | Thomsen et al. | |
| 2007/0047598 A1* | 3/2007 | Liu | H01S 3/0064 372/6 |
| 2007/0216989 A1* | 9/2007 | Nerin | G02F 1/365 359/326 |
| 2010/0296154 A1* | 11/2010 | Solli | G02F 1/353 359/333 |
| 2012/0033686 A1 | 2/2012 | Abdelalim et al. | |
| 2012/0049092 A1* | 3/2012 | Tu | G02F 1/353 250/504 R |
| 2012/0236314 A1* | 9/2012 | Fermann | H01S 3/10 356/479 |
| 2012/0281720 A1* | 11/2012 | Fermann | H01S 3/0675 372/6 |
| 2012/0294323 A1* | 11/2012 | Lin | H01S 3/0057 372/25 |
| 2013/0188240 A1* | 7/2013 | Shaw | G02F 1/3532 359/326 |
| 2016/0156148 A1* | 6/2016 | Thomsen | G02B 6/02376 356/72 |
| 2016/0170136 A1* | 6/2016 | Johansen | G02B 6/02361 356/479 |
| 2016/0195793 A1* | 7/2016 | Grudinin | G01N 21/6458 359/327 |
| 2016/0365697 A1* | 12/2016 | Hori | H01S 3/1616 |
| 2017/0085051 A1* | 3/2017 | Thomsen | G02B 6/02214 |
| 2017/0352999 A1* | 12/2017 | Cormier | H01S 3/0092 |
| 2019/0123506 A1* | 4/2019 | Krupa | H01S 3/302 |

OTHER PUBLICATIONS

Klimczak et al., "Spectral Coherence in All-Normal Dispersion Supercontinuum in Presences of Raman Scattering and Direct Seeding from Sub-Picosecond Pump," Dec. 15, 2014, Optical Society of America, Optics Express, 22, 26, 31635-31645. (Year: 2014).*

Nishizawa et al., "Octave Spanning High-Quality Supercontinuum Generation in All-Fiber System," Aug. 2007, J. Opt. Soc. Am. B., 24, 8, 1786-1792. (Year: 2007).*

Huang, "Fiber-Optic Analogs of Bulk-Optic Wave Plates", Jun. 20, 1997, Applied Optics, vol. 36, No. 18, 4241-4258. (Year: 1997).*

European Search Report dated Oct. 17, 2019 of corresponding application No. EP19382313; 14 pgs.

Xiaomin Liu et al: "Monolithic Highly Stable Yb-Doped Femtosecond Fiber Lasers for Applications in Practical Biophotonics", IEEE Journal of Selected Topics in Quantum Electronics, IEEE Service Center, Piscataway, NJ, US, vol. 18, No. 4, Jul. 1, 2012 (Jul. 1, 2012), pp. 1439-1450, 12 pgs.

Chunlei Huang et al: "Ultraflat, broadband, and highly coherent supercontinuum generation in all-solid microstructured optical fibers with all-normal dispersion", Photonics Research, vol. 6, No. 6, May 23, 2018 (May 23, 2018), 8 pgs.

Qi W et al: "Microstructured Inline Optical Fiber Structure for Dispersion Control and Coherent Supercontinuum Generation", IEEE Photonics Journal, IEEE, USA, vol. 8, No. 3, Jun. 1, 2016 (Jun. 1, 2016), pp. 1-9, 10 pgs.

L. E. Hooper et al. "Coherent supercontinuum generation in photonic crystal fibre with all-normal group velocity dispersion", Optics Express, 19, pp. 4902-4907, 2011., 6 pgs.

S. Demmler, et al. "Generation of high quality, 1.3 cycle pulses by active phase control of an octave spanning supercontinuum", Optics Express, 19, 20151-20158, 2011., 8 pgs.

Alexander M. Heidt et al. "High quality sub-two cycle pulses from compression of supercontinuum generated in all normal dispersion photonic crystal fiber", Optics Express, 19, 13873-13879, 2011., 7 pgs.

M. Miranda et al., "Characterization of broadband few-cycle laser pulses with the d-scan technique," Optics Express 20, 18732-18743, 2012, 12 pgs.

J. M. Dudley and S. Coen, "Coherence properties of supercontinuum spectra generated in photonic crystal and tapered optical fibers," Optics Letters, 27, 1180-1182, 2002., 3 pgs.

A. M. Heidt et al., "Limits of coherent supercontinuum generation in normal dispersion fibers," JOSA B, 34, 764-775, 2017., 12 pgs.

A. F. J. Runge et al., "Coherence and shot-to-shot spectral fluctuations in noise-like ultrafast fiber lasers," Optics Letters, 38, 4327-4330, 2013., 4 pgs.

* cited by examiner

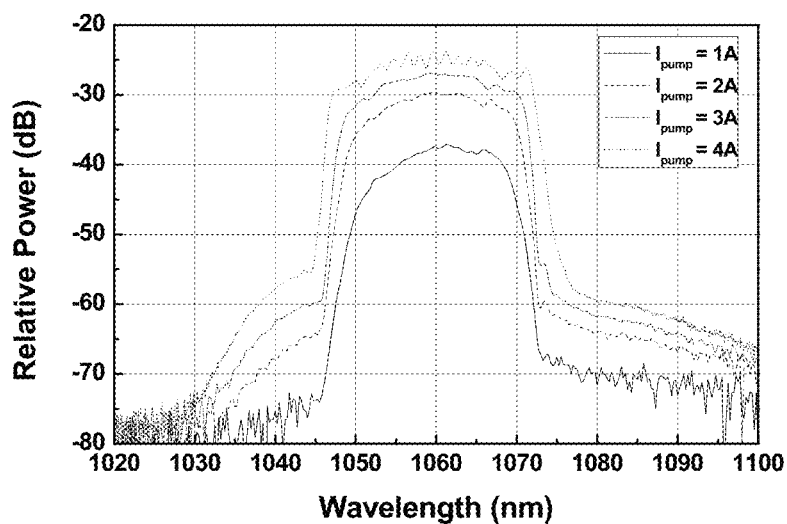
Fig. 3A
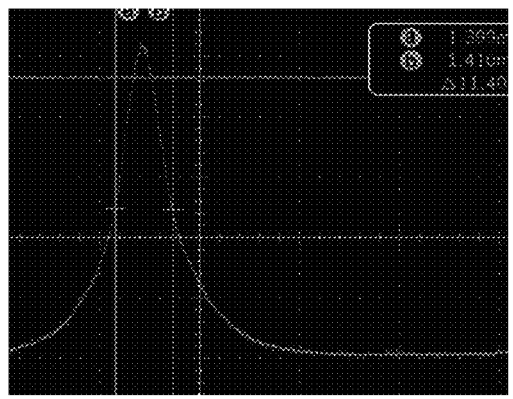
Fig. 3B1
Fig. 3B2
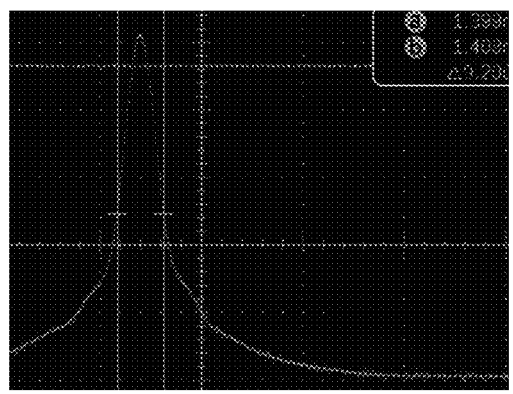
Fig. 3B3
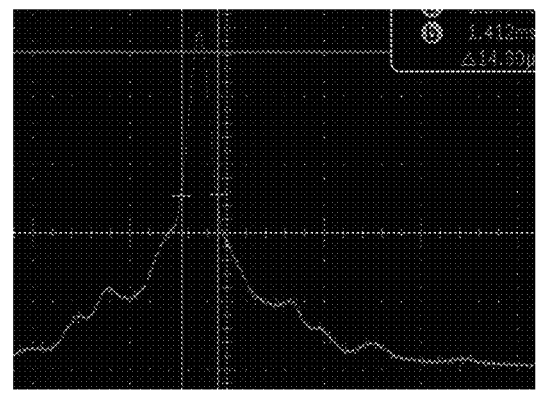
Fig. 3B4

ALL-FIBER CONFIGURATION SYSTEM AND METHOD FOR GENERATING TEMPORALLY COHERENT SUPERCONTINUUM PULSED EMISSION

FIELD

The present invention is directed, in general, to optical fiber systems and methods. In particular, the invention relates to an all-fiber configuration system and method for generating temporally coherent supercontinuum pulsed emission.

BACKGROUND

Supercontinuum (SC) lasers emit ultra-broadband spectra in short pulses of high repetition rates. Hence, supercontinuum lasers are in principle an ideal source for Fluorescent Lifetime Imaging Microscopy (FLIM) and Multiphoton Excitation (MPE) Microscopy. The broadest SC spectra (up to 400 to 2500 nm using $SiO_2$ fibers) are generated by pumping highly nonlinear Microstructured Optical Fibers (MOFs), also known as Photonic Crystal Fibers (PCFs), with femtosecond or picosecond pulses in the anomalous group velocity dispersion (GVD) regime of the PCF, close to the zero-dispersion wavelength (ZDW). In this case, spectral broadening is dominated by soliton effects where higher order solitons break down into a series of fundamental solitons. Each fundamental soliton is then Raman shifted to a longer wavelength. This broadening mechanism leads to complex temporal pulse profile, lack of spectral flatness, increase of noise, and low coherence across the bandwidth due to the fluctuations in relative phase and intensity. Under these conditions, the generated pulses are useless for applications requiring high temporal coherence, e.g. advanced efficient multiphoton microscopy.

Nevertheless, in the last years, research on supercontinuum generation, has demonstrated new successful approaches to overcome lack of coherence of supercontinuum pulses, obtaining very high-quality few-cycle pulses: pumping near the flattened top of the convex dispersion curves of all-normal dispersion (ANDi) PCFs (whose dispersion lies completely in the normal dispersion region), spectral broadening appears due to the action of self-phase modulation (SPM). In this way, highly coherent, flat-top, supercontinuum can be generated, preserving a compressible single pulse in the temporal domain.

Proofs of concept of such approach have been demonstrated in the last years [1-3]. But yet, the whole system comprising pump laser plus ANDi PCF plus pulse compression management is complex, fragile, and sensitive to environmental variations, expensive and with very low efficiency.

In state-of-the-art systems [1-3], the ANDi PCF is pumped using a high power laser (Solid State Ti-Sa laser, OPO or MOPA lasers of already-short pulses of tens to hundreds of femtoseconds). The pumping light is launched into the ANDi PCF after a complex focusing and/or dispersion pre-compensating free-space optical setup. In this process, a high amount of power (typically >95%) is wasted. Unlike in the prior art, see FIG. 1, such pumping of light in the present invention is monolithic, meaning that the output of the pumping laser is coupled by direct splice or fiber transition to the ANDi PCF. This decreases enormously (up to 2 orders of magnitude) the required power of the pumping laser to obtain the same result at the output of the ANDi PCF. Dramatic implications arise, consequently, in cost, simplicity, robustness and energy-saving of the fiber laser seed source.

Moreover, one of the main interests of all-fiber optical sources is the fact that the signal remains confined in the core of the fibers in every stage/section of the source structure and also in the transitions between stages/sections. Avoidance of free-space propagation between stages confers unequalled robustness to all-fiber lasers, since mechanical vibrations or environmental fluctuations (temperature, pressure, and humidity) do not bias misalignment of light between stages of the source.

However, none of the current state-of-the-art configurations of temporally coherent supercontinuum generation using ANDi PCFs is an all-fiber configuration. On the one hand, in [2 and 3] the seed stage (or pump stage) of the laser is not fiber-based, but built with free-space optics technology: e.g. Ti-Sapphire crystals lasers, Optical Parametric Oscillators (OPOs) or Optical Parametric Amplifiers (OPAs). On the other hand, in [1], the seed stage is a fiber laser but light coupling to the ANDi PCF is performed with free-space optics.

There are also known some patents and/or patent applications in the field. For example, U.S. Pat. No. 9,553,421-B2 relates to compact, low noise, ultra-short pulse sources based on fiber amplifiers, and various applications thereof. At least one implementation includes an optical amplification system having a fiber laser seed source producing seed pulses at a repetition rate corresponding to the fiber laser cavity round trip time. A nonlinear pulse transformer, comprising a fiber length greater than about 10 m, receives a seed pulse at its input and produces a spectrally broadened output pulse at its output, the output pulse having a spectral bandwidth which is more than 1.5 times a spectral bandwidth of a seed pulse. A fiber power amplifier receives and amplifies spectrally broadened output pulses. A pulse compressor is configured to temporally compress spectrally broadened pulses amplified by said power amplifier. Applications include micro-machining, ophthalmology, molecular desorption or ionization, mass-spectroscopy, and/or laser-based, biological tissue processing. Unlike present invention, in this optical amplification system ANDi PCFs are not included neither a fiber-based compression stage previous to a spectrally broadening stage of the pulse is performed.

U.S. Pat. No. 8,971,358-B2 discloses coherent and compact supercontinuum light sources for the mid IR spectral regime. The supercontinuum generation is based on the use of highly nonlinear fibers or waveguides. In at least one embodiment the coherence of the supercontinuum sources is increased using low noise mode locked short pulse sources. Compact supercontinuum light sources can be constructed with the use of passively mode locked fiber or diode lasers. Wavelength tunable sources can be constructed using appropriate optical filters or frequency conversion sections. Highly coherent supercontinuum sources further facilitate coherent detection schemes and can improve the signal/noise ratio in lock in detection schemes. Contrary to present invention, the design proposed by this prior art document is for central wavelengths >1700 nm, includes free-space propagation in the structure of the short pulse source, and does not generate pulses with a temporal coherence such that they can be compressed down to the Fourier transform limit pulse width corresponding to their spectral bandwidth.

U.S. Pat. No. 9,341,920-B1 provides a wavelength convertor that includes a beam splitter which splits a pulsed laser beam at wavelength /gyp into a first higher power pulse portion and a second low power pulse portion. A fiber super continuum (SC) generator is coupled to receive the second pulse portion which converts the second pulse portion into a SC pulse having a bandwidth of >100 nm including a narrow spectral portion at wavelength λs. An optical parametric amplifier (OPA) having a periodically poled material is included with domains arranged to provided quasi-phase matching for amplification at λs and pumping at λp. The arrival of the SC pulse portion at λs and the first pulse portion at the OPA is synchronized to overlap in time. The OPA is seeded by the SC pulse portion at λs and pumped by the first pulse portion to provide an amplified OPA seed at λs. Unlike present invention, this solution is not an all-fiber scheme.

US 2012281720-A1 discloses a low noise fiber based coherent supercontinuum source allowing for broad spectral coverage. In order to increase the coherence of the supercontinuum, highly nonlinear fibers having a nonlinear response with an enhanced vibrational contribution are implemented. In particular, the relative vibrational contribution α to the nonlinear response function is selected to be α>0.18 in silica glasses. Alternatively, the ratio R=(peak Raman gain coefficient)/(nonlinear refractive index) is selected such that $R > 5 \times 10 <6> m <-1>$. The optical system proposed by this patent application is also for central wavelengths >1700 nm. Moreover, ANDi PCFs are not used. Likewise, compression of a pulse width is not performed via an all-fiber compression section.

Other optical systems are known by US 2012033686-A1, U.S. Pat. Nos. 9,590,381-B2, 9,986,904-B2 and 9,825,419-B2.

Therefore, despite all these prior art solutions, up to now, a complete all-fiber solution to obtain femtosecond temporally coherent supercontinuum using ANDi PCFs (also referred to as ANDi microstructured fibers) has not been yet proposed. This is difficult mainly for the following reasons:

On the one hand, to generate a temporally coherent spectral broadening in an ANDi PFC fiber by the SPM nonlinear effect, input pulses to the ANDi fiber have to present a very high peak power (typically >15 kW for an ANDi fiber of 20 cm length and core diameter of 2.6 μm). To achieve such intense input pulses with a moderate average power (typ. less than 1 W, since average powers over ~1 W induce irreversible thermal damage in the ANDi fiber), their temporal width has to be already very short (typ. <250 fs). OPOs, Ti:sapphire Lasers or MOPAs, with laser generation architectures based in free-space configuration, deliver naturally pulses of this type. On the contrary, for an all-fiber laser architecture it is a challenge to offer pulses with these properties to be delivered to an ANDi fiber because the light is completely confined in the cores of fibers, whose core diameters are typically below 10 μm. Peak powers of >15 kW inside guiding fibers of 10 μm core diameters yield intensities of >15 $GW/cm^2$ which are over the threshold of many non-desired nonlinear effects that distort the laser pulses propagating inside and, in particular, destroy the temporal coherence of the laser pulse. The present invention discloses particular all-fiber laser configurations that overcome this problem delivering pulses of typically >15 kW peak power and <250 fs pulse width maintaining temporal coherence, to be used as exciting sources of the ANDi PCFs.

On the other hand, it is relatively easy to focus the output pulses from an OPO, Ti:sapphire or MOPA laser in a free-space configuration into the input of a PCF ANDi fiber [2, 3]. On the contrary, delivering the output of the exciting laser through a fiber to the input of the ANDi fiber is complex, mainly for 2 reasons:

1. In a standard optical fiber transition from a given exciting laser output to the input of an ANDi PCF of core diameter as small as 2.6 μm, peak powers of >15 kW generate non-desired nonlinear effects (spectral and temporal) in the fiber transition that destroy the temporal coherence of the pulse, which cannot be recovered afterwards.
2. Since peak powers required for efficient SPM generation in the ANDi PCF are very high (typ. >15 kW), an efficient energy coupling from the output of the exciting laser to the PCF is required to avoid thermal damage in the fiber transition. Energy coupling in a standard fiber transition or splice from large to small core diameters is inefficient. The typical core diameters of the amplifying fibers used to reach high peak powers at the output of an exciting laser is in the range of 6-10 μm. More than 90% of the power is lost in a standard transition or splice from such fiber to an ANDi PCF fiber. Consequently the power required at the output of the exciting laser is at least an order of magnitude higher than the power required at the input of the ANDi PCF fiber. Such powers (>150 kW) exceed the thermal damage threshold of the fiber transition or splice, hence the transition is unfeasible.

SUMMARY

To overcome the cited drawbacks of the prior art, present invention provides, according to a first aspect, an all-fiber configuration system for generating temporally coherent supercontinuum pulsed emission. The proposed system comprises a sequential structure of all-fiber sections coupled through fused fiber splices or through fiber transitions. The all-fiber sections include, in the following order: a fiber laser seed source configured to produce a seed pulse with given optical properties including a spectral bandwidth that corresponds to a Fourier transform limited temporal pulse width of 1 picosecond or below at Full Width Half Maximum (FWHM); a stretching section, including an optical fiber, configured to temporally stretch the seed pulse; an amplification section, including an active optical fiber, doped with a rare earth element, configured to amplify the stretched pulse by progressively stimulating radiation of active ions of the doped active optical fiber; a compressing section configured to temporally compress the amplified pulse; and a spectrum broadening section including a single-mode all normal dispersion (ANDi) microstructured fiber that spectrally broadens the compressed pulse by a nonlinear effect of Self Phase Modulation (SPM), while maintaining the temporal coherence of the pulse, such that the pulse at an output of the spectrum broadening section has a FWHM spectral bandwidth of 60 nanometers or more, and is compressible down to a temporal pulse width corresponding to the Fourier limit of its spectral bandwidth.

Hence, an all-fiber configuration is proposed that overcomes the drawbacks of the prior art, delivering pulses of typically >15 kW peak power and <250 fs pulse width maintaining temporal coherence, to be used as exciting source of ANDi microstructured fibers.

The compressing section and the spectrum broadening section are coupled via a fiber transition having a number of pieces of fibers of different fundamental mode field sizes designed to provide a total power coupling efficiency between the compressing section and the spectrum broadening section over 60%.

The ANDi microstructured fiber can have a length of 1 meter or less, normal group delay dispersion (GDD) and normal group velocity dispersion (GVD). In particular, the GVD is lower than 0 ps/nm/km and higher than −30 ps/nm/ km, in the whole range of wavelengths comprised within ±150 nm of a central wavelength of emission of the fiber laser seed source. The peak intensity of the pulse at an input of the ANDi microstructured fiber is equal to or greater than 60 GW/cm².

In particular, the average power of the pulse at an output of the amplification section is equal to or greater than 0.3 W and an average power of the pulse at the output of the spectrum broadening section is equal to or greater than 100 mW.

In an embodiment, the stretching section also includes a fused fiber combiner configured to further receive light from a laser diode and launch the received light to the amplification section. In this case, the optical fiber of the stretching section is a single mode optical fiber having normal GDD. Moreover, the rare earth element comprises ytterbium, such that the doped active fiber is an ytterbium doped active fiber. The latter has normal GDD.

Likewise, the compressing section includes a hollow core microstructured fiber with anomalous GDD.

In another embodiment, the optical fiber of the stretching section is a hollow core microstructured fiber with anomalous GDD. In this case, the system further comprises a fused fiber combiner configured to further receive light from a laser diode and launch the received light to the doped active optical fiber; particularly an ytterbium doped active fiber with normal GDD. According to this embodiment, both the compressing section and the amplification section are provided by said ytterbium doped active optical fiber.

In a particular embodiment, all the optical fibers of the all-fiber sections are polarization maintaining fibers.

The proposed system can further include a fiber isolator positioned between at least two of the all-fiber sections.

In yet another embodiment, the fiber laser seed source is a mode locked fiber laser. The laser can be configured to produce a single-shot pulse or several seed pulses at a repetition rate in the range from 1 Hz to 10 GHz.

Present invention also provides according to a second aspect a method for generating temporally coherent supercontinuum pulsed emission, the method comprising following steps: providing an all-fiber system by coupling a sequential structure of all-fiber sections through fused fiber splices and/or fiber transitions; producing, by a fiber laser seed source of said sequential structure, at least one seed pulse with given optical properties including a spectral bandwidth that corresponds to a Fourier transform limited pulse width of 1 picosecond or below at FWHM; temporally stretching the seed pulse by a stretching section of said sequential structure, said stretching section including an optical fiber; amplifying, by an amplification section of the sequential structure, the stretched pulse by progressively stimulating radiation of active ions of an active optical fiber, doped with a rare earth element and included in said amplification section; temporally compressing the amplified pulse by a compressing section of the sequential structure; and spectrally broadening, by a spectrum broadening section including a single-mode ANDi microstructured fiber the compressed pulse by a nonlinear effect of SPM, while maintaining the temporal coherence of the pulse, such that the pulse at an output of the spectrum broadening section has a FWHM spectral bandwidth of 60 nanometers or more, and is compressible down to a temporal pulse width corresponding to the Fourier limit of its spectral bandwidth.

In an embodiment, the amplifying of the stretched pulse is performed independently of the pulse compression. Therefore, the pulse compression in this case is performed via a hollow core microstructured fiber having anomalous GDD. The doped active optical fiber comprises an ytterbium doped active fiber having normal GDD.

In another embodiment, both the amplifying and the temporal compressing of the pulse are performed via said doped active fiber, the latter being an ytterbium doped active fiber having normal GDD.

According to the proposed method, the following optical properties of the pulse at said output of the spectrum broadening section are obtained: central wavelength of emission=1060 nm; FWHM spectral bandwidth=150 nm; Average Power=0.14 W and Peak Intensity=439 GW/cm². Moreover, the temporal coherence of the pulse at the output of the spectrum broadening section is demonstrated by actually compressing the pulse down to a temporal pulse width of 14. 8 fs.

Present invention also provides according to a third aspect different uses of the proposed all-fiber configuration system. In particular, the proposed system can be used in multiphoton excitation applications, multiphoton microscopy, the two photon absorption-transient current technique (TPA-TCT), generation of Terahertz waves, generation of frequency combs, frequency comb spectroscopy, time and frequency metrology, calibration of astronomical spectrographs, generation of attosecond pulses, radiofrequency arbitrary waveform generation and optical communications.

Therefore, present invention integrates monolithically all parts of an optical fiber source and couples with low insertion losses the light propagated inside an optical fiber with a given core diameter into an optical fiber with a lower core diameter (i.e. the ANDi microstructured fiber, which has the dispersion and nonlinear properties needed to generate temporally coherent supercontinuum pulsed emission), hence avoiding the need of free-space propagation in any of the sections/stages of the laser structure.

Moreover, present invention provides a configuration of optical fiber stages/sections such that the ANDi microstructured fiber is excited (by direct fiber coupling) with optical pulses of temporal width of few hundreds of femtoseconds and sufficient peak power to generate a temporally coherent broadening of the spectrum in the ANDi microstructured fiber by the nonlinear effect of SPM. A broadening of up to 150 nm is demonstrated, corresponding to transform limited pulses of pulse width down to 13.8 fs. This is not the theoretical limit of the proposed system and method, thus pulse widths down to below 10 fs are expected to be achieved.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 3A illustrates the optical spectrum of the pulsed signal at the output of the hollow core fiber compression section for different values of the electric current of the laser diode, $I_{pump}$, from 1 to 4 Amperes.

FIG. 3B1 illustrate the autocorrelation trace of the pulsed signal at the output of the hollow core fiber compression section for different values of the electric current of the laser diode, $I_{pump}$, from 1 Ampere.

FIG. 3B2 illustrate the autocorrelation trace of the pulsed signal at the output of the hollow core fiber compression section for different values of the electric current of the laser diode, $I_{pump}$, from 2 Ampere.

FIG. 3B3 illustrate the autocorrelation trace of the pulsed signal at the output of the hollow core fiber compression section for different values of the electric current of the laser diode, $I_{pump}$, from 3 Ampere.

FIG. 3B4 illustrate the autocorrelation trace of the pulsed signal at the output of the hollow core fiber compression section for different values of the electric current of the laser diode, $I_{pump}$, from 4 Ampere.

FIG. 6A shows the second harmonic generation d-scan retrieval, in which, the top left image shows the measured, calibrated d-scan trace; the top right image shows the retrieved scan trace; the bottom left image shows in solid line the measured linear spectrum and in dashed line the retrieved spectral phase; and the bottom right image shows in dashed line the temporal intensity profile of the transform limited pulse and in solid line the temporal intensity profile of the measured pulse, and the pulse width measurement result obtained is 19.82 fs

DETAILED DESCRIPTION

Present invention provides an all-fiber configuration system (two approaches are detailed) and method for generating temporally coherent supercontinuum pulsed emission.

Present invention can be used in a wide variety of applications, for example in multiphoton excitation applications, multiphoton microscopy, the two photon absorption-transient current technique (TPA-TCT), generation of Terahertz waves, generation of frequency combs, frequency comb spectroscopy, time and frequency metrology, calibration of astronomical spectrographs, generation of attosecond pulses, radiofrequency arbitrary waveform generation and optical communications.

Figure 1:
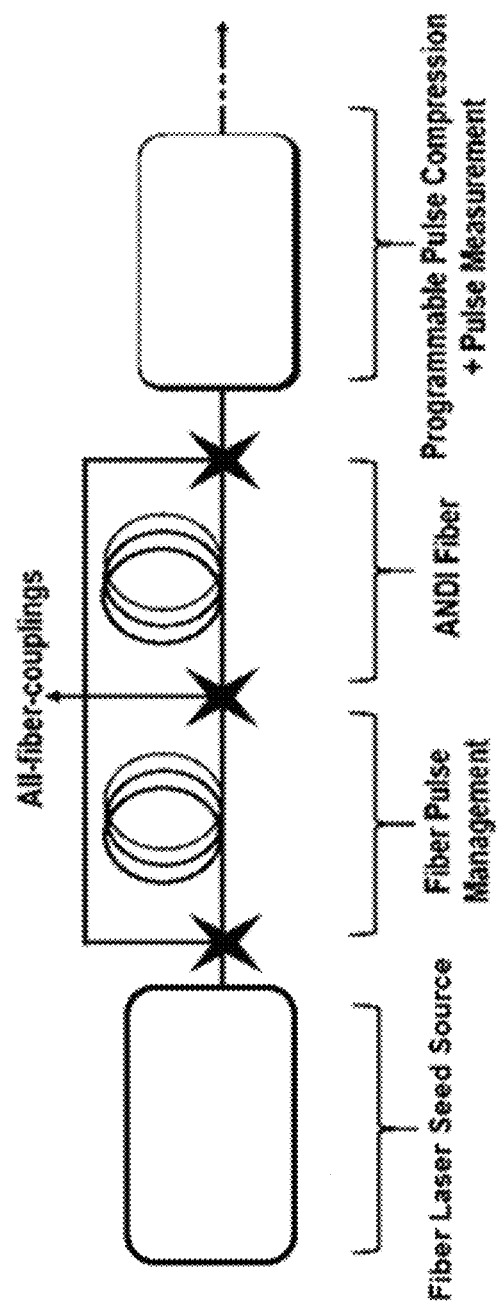
FIG. 1 schematically illustrates a simplified arrangement of the proposed all-fiber configuration system.
Figure 2:
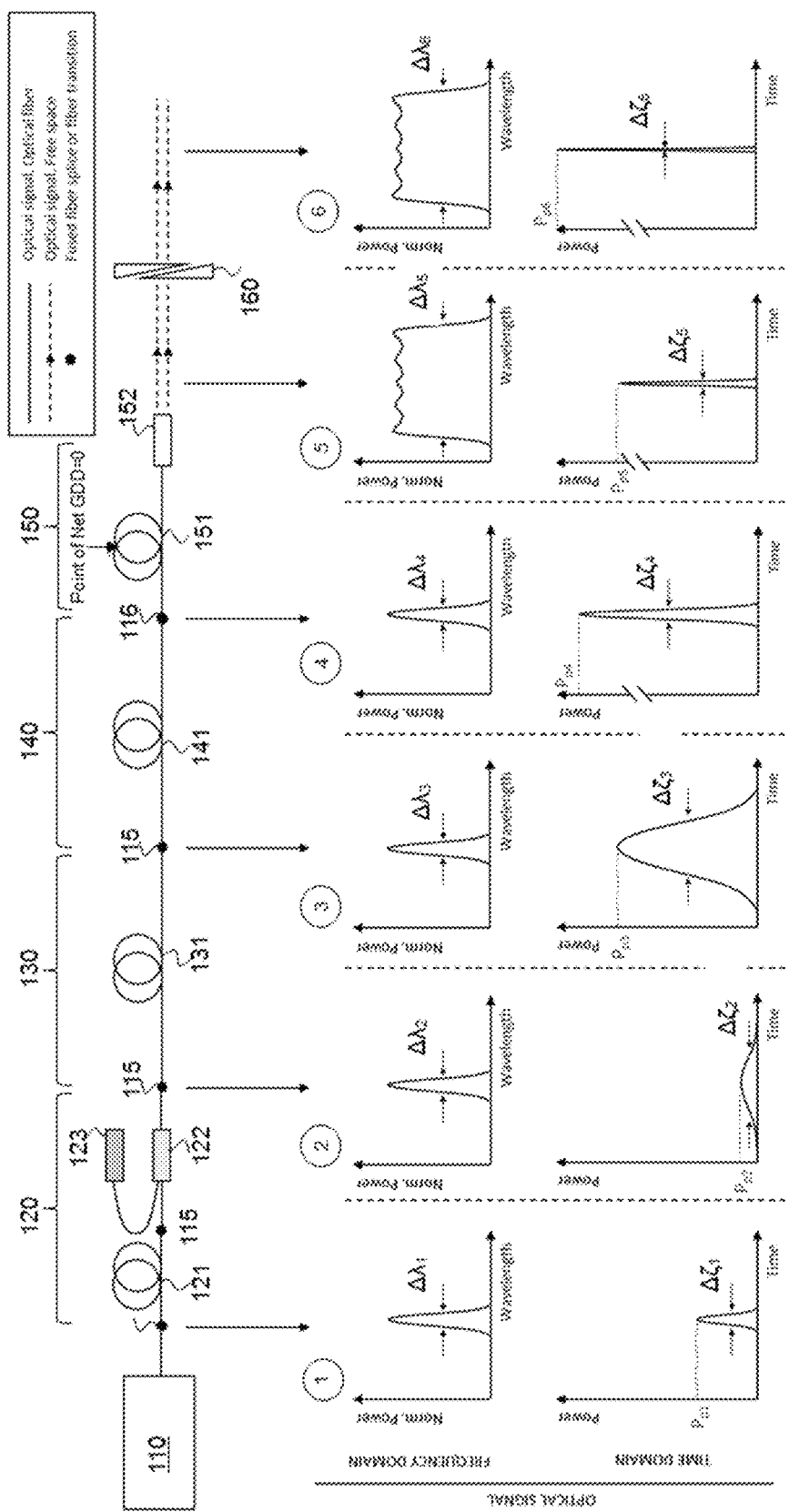
FIG. 2 illustrates an all-fiber configuration with pulse compression after the amplification section (amplification and compression occurring sequentially), according to an embodiment of the present invention.
Figure 7:
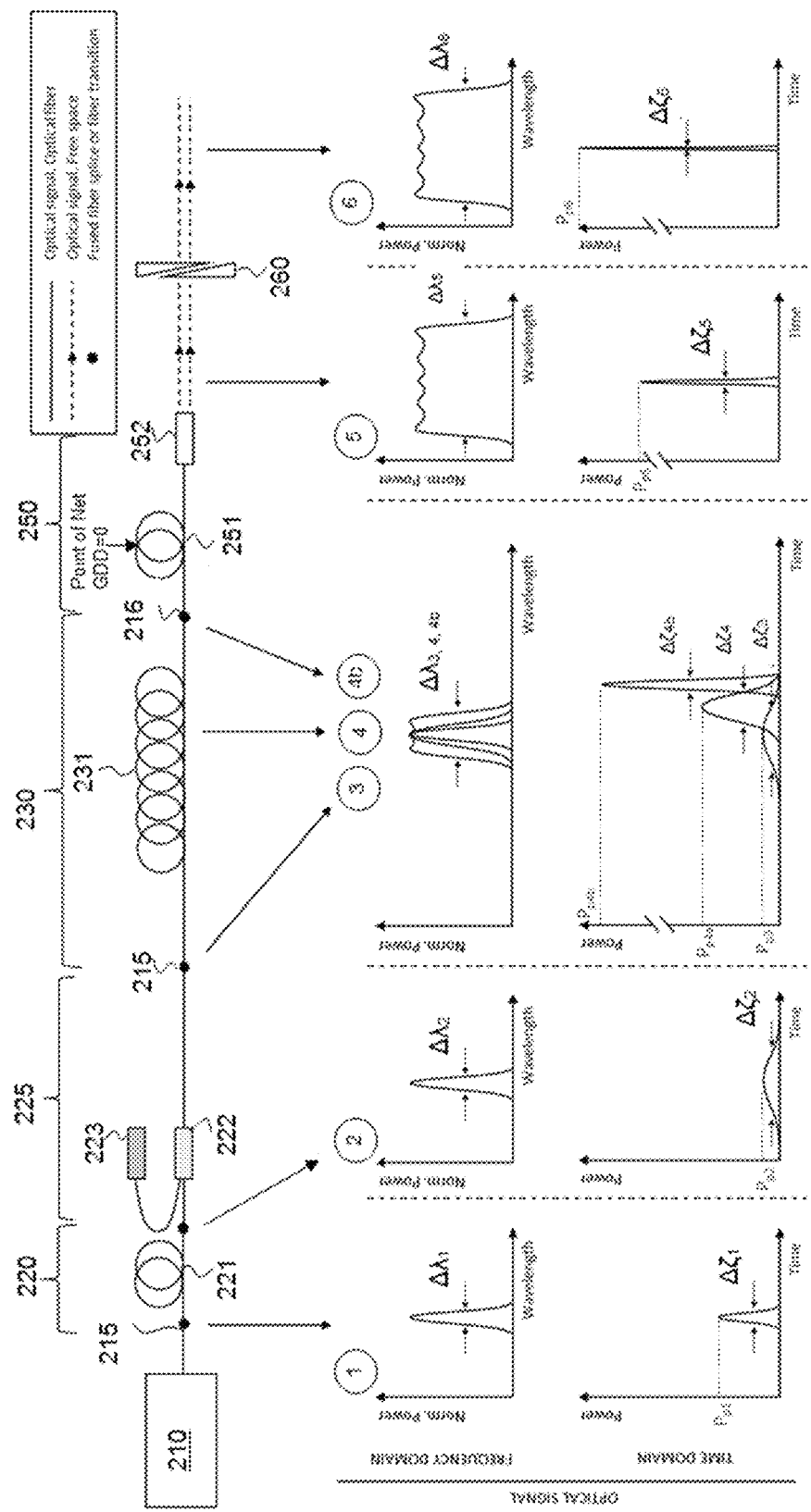
FIG. 7 illustrates an all-fiber configuration with compression and amplification processes occurring progressively and simultaneously in the amplification section, according to an embodiment of the present invention.

With reference to FIG. 1, therein it is illustrated a generic design of the proposed all-fiber configuration system. As seen in FIG. 1, and in more detail in FIGS. 2 and 7, present invention approach to obtain an all-fiber configuration of femtosecond temporally coherent supercontinuum sources is based in a sequential structure of all-fiber sections, each of them connected/coupled to the next by a fused fiber splice or a fiber transition. The optical properties of each section and the order of the sequence between them are designed to obtain input pulses to an ANDi microstructured fiber with the peak power required to be spectrally broadened by the nonlinear process of SPM inside the ANDi microstructured fiber while maintaining temporal coherence. Thus, being compressible down to pulse widths corresponding to the Fourier limit of their spectrum.

FIG. 2 illustrates a first embodiment of the proposed all-fiber configuration system.

According to this first embodiment, a fiber laser seed source 110 is configured to produce/deliver short pulses at high repetition rate. At an output of the fiber laser seed source 110 the optical properties of the pulse(s) are the following: Spectral bandwidth (at Full Width Half Maximum, FWHM) $\Delta\lambda_1=13.6$ nm; Temporal pulse width (at FWHM) $\Delta\tau_1=3.1$ ps; Peak Power $P_{p1}=86$ W; Central wavelength=1060 nm; Pulse repetition rate=75 MHz. The central wavelength and the pulse repetition rate remain unchanged throughout all the sections of the all-fiber system.

The fiber output of the fiber laser seed source 110 is coupled to a fiber input of next section (stretching section 120) via a fused fiber splice 115.

The stretching section 120 comprises a single mode (SM) optical fiber 121 and a fused fiber combiner 122. The fibers of this section 120 through which the pulse(s) propagates/propagate have normal group delay dispersion (i.e. GDD>0), and particularly a total length of 20 m and a mode field diameter of 6.2 μm. The function of the stretching section 120 is to stretch the pulse(s) temporally so that it/they can be amplified in next section without generating nonlinear effects (the peak power remains below threshold of generation of nonlinear effects in the optical fiber core).

Also, the stretching section 120 pre-compensates the anomalous dispersion that the pulse(s) will suffer in the compressing section 140. The fused fiber combiner 122 launches light from a laser diode 123 into an active fiber 131, doped with a rare earth element, of next section 130. At the fiber output of the stretching section 120 the optical properties of the stretched pulse(s) are the following: FWHM spectral bandwidth $\Delta\lambda_2=13.6$ nm; FWHM temporal pulse width $\Delta\tau_2=9.6$ ps; Peak Power $P_{p2}=27.8$ W; Peak Intensity $I_{p2}=92$ MW/cm$^2$.

The fiber output of the stretching section 120 is coupled to the fiber input of next section (amplification section 130) via a fused fiber splice 115.

The amplification section 130 of this first embodiment particularly comprises a double clad ytterbium doped active fiber 131, with normal group delay dispersion (i.e. GDD>0), a total length of 4.5 m and a mode field diameter of 6.2 µm. It should be noted that the rare earth element of the active optical fiber 131 in other embodiments could comprise other rare earth elements such as erbium, neodymium, yttrium, thulium, holmium, gadolinium, terbium, neodymium, among others. The function of the amplification section 130 is to amplify the stretched pulse(s) to the maximum possible peak power without biasing nonlinear effects that would distort the temporal and spectral shape of the pulse(s). The amplification is produced progressively in the ytterbium doped active fiber 131 by stimulated radiation of the active ytterbium ions of the fiber core, which are pumped to excited states by the light coming from the laser diode 123 through the first clad of the ytterbium doped active fiber 131 (this clad is passive, not doped). At the fiber output of the amplification section 130 the optical properties of the pulse(s) are the following: FWHM spectral bandwidth $\Delta\lambda_3=14.5$ nm; FWHM temporal pulsewidth $\Delta\tau_3=15$ ps; Average Power $P_3=0.4$ W; Peak Power $P_{p3}=356$ W; Peak Intensity $I_{p3}=1.18$ GW/cm$^2$.

The fiber output of the amplification section 130 is coupled to the fiber input of next section (compressing section 140) via a fused fiber splice 115. It could be equally done via a fiber transition.

The compressing section 140 comprises a hollow core microstructured fiber 141 with anomalous group delay dispersion (i.e. GDD <0), and particularly a total length of 10 m and a mode field diameter of 7.2 µm. The function of the compressing section 140 is to temporally compress the pulse(s) to achieve the peak power required at the input of the spectrum broadening section 150 to efficiently generate temporally coherent spectral broadening by SPM. Also, its length is designed so that the net GDD suffered by the pulse(s) from the output of the fiber laser seed source 110 is slightly negative (or anomalous): −0.015 ps$^2$. Doing so, the pulse(s) still suffers/suffer compression in the first segment of the ANDi microstructured fiber 151 and SPM efficiency is optimized by having the maximum peak power achievable inside the ANDi microstructured fiber 151. The anomalous group velocity dispersion (GVD) of the hollow core microstructured fiber 141 is −72×10$^3$ fs$^2$/m. Since the material of the core is air, nonlinear effects due to high peak power are avoided; hence the pulse(s) does/do not suffer spectral broadening. At the fiber output of the compressing section 140 the optical properties of the pulse(s) are the following: FWHM spectral bandwidth $\Delta\lambda_4=14.5$ nm; FWHM temporal pulse width $\Delta\tau_4=200$ fs; Average Power $P_4=0.3$ W; Peak Power $P_{p4}=20.0$ kW; Peak Intensity $I_{p4}=45$ GW/cm$^2$.

The fiber output of the compressing section 140 is coupled to the fiber input of next section (spectrum broadening section 150) via a specially designed fiber transition 116, as it will be detailed below.

The spectrum broadening section 150 comprises said ANDi microstructured fiber 151. In particular, in this embodiment, the ANDi microstructured fiber 151 has a total length of 20 cm and a core diameter of 2.6 µm. GDD in the ANDi microstructured fiber 151 is normal within a very broad spectral band (comprising from less than 1060-150 nm to more than 1060+150 nm), with a quasi-flat and symmetric shape to generate linear SPM, and very close to 0 in order to limit pulse stretching as much as possible. A further description of the ANDi microstructured fiber 151 is given below. Function of the spectrum broadening section 150 is to spectrally broaden the spectrum of the pulse(s) by SPM nonlinear effect, maintaining the temporal coherence of the pulse(s) so that it/they can be compressible down to pulse widths corresponding to the Fourier limit of their spectrum. At the fiber output of the spectrum broadening section 150 the optical properties of the pulse(s) are the following: FWHM spectral bandwidth $\Delta\lambda_5=150$ nm; FWHM temporal pulsewidth $\Delta\tau_5=80$ fs; Average Power $P_5=0.14$ W; Peak Power $P_{p5}=23.3$ kW; Peak Intensity $I_{p5}=439$ GW/cm$^2$.

The fiber output of the spectrum broadening section 150 is delivered to free-space. In this first embodiment, this delivery is performed via a fiber coupled collimator 152.

Despite not forming part of the invention, after the cited fiber coupled collimator 152, a free-space compressor 160 of variable anomalous dispersion (GDD<0) is included. The variable compressor 160 is configured to compress the temporally coherent pulse(s) from the output of the spectrum broadening section 150 to an arbitrary pulse width ranging from the value at the output of the spectrum broadening section 150 (80 fs) to the value corresponding to the Fourier limit of its spectrum (13.8 fs). Since the net GDD suffered by the pulse(s) through the complete all-fiber system is normal (net GDD>0), the dispersion of the variable compressor 160 needs to be negative to temporally compress the pulse(s). In this particular embodiment, the third-order dispersion (TOD) coefficient of the free-space compressor is negligible. The intensity of the pulse(s) is now very low because the free-space beam is typically higher than 1 mm. Nonlinear effects in the variable compressor 160 are therefore inexistent and the spectrum shape is maintained. At the output of the variable compressor 160 the optical properties of the pulse(s) are the following: FWHM spectral bandwidth $\Delta\lambda_6=150$ nm; FWHM temporal pulse width $\Delta\tau_6=14.8$ fs; Peak Power $P_{p6}=44.5$ kW.

Optical fibers of all sections are, particularly, polarization maintaining to obtain an optical output with a linearly polarized state of polarization.

FIG. 3A and FIGS. 3B1-B4 show, respectively, the optical spectrum and the autocorrelation measurement of the pulsed signal at the fiber output of the compressing section 140 for different values of the electric current that drives the laser diode 123, $I_{pump}$, from 1 to 4 Amperes. Since the optical fiber 141 of the compressing section 140 has a hollow core, nonlinearities due to high peak power of the pulses are avoided, hence the spectrum keeps a similar shape irrespective of the peak power of the pulse (which increases when $I_{pump}$ increases). Likewise, the pulse width at the output of the fiber 141 is approximately the same (in a range between 200 and 321 femtoseconds) for all currents, since the anomalous amount of GDD introduced by the fiber 141 does not depend on the peak power of the pulse. Irregularities in spectrum and autocorrelation trace at $I_{pump}=4$ A indicate that the signal is reaching the threshold over which the pulses begin to be unstable, losing temporal coherence.

Spectra have been taken with 50 pm spectral resolution using a YOKOGAWA AQ6373B optical spectrum analyser. Autocorrelation traces have been obtained with a Femtochrome Research FR-103XL Autocorrelator. For this autocorrelator model, the correspondence between the temporal pulse width of the voltage signal delivered by the autocorrelator (recorded with an oscilloscope), $\Delta\tau_{FWHM}$, and the actual temporal width of the optical intensity of the pulse $\Delta\tau_{FWHM}$ is given by the equation $\Delta\tau_{FWHM}(ps)= \Delta\tau_{FWHM}(ms)*0.7*31$ ps/ms (assuming a Gaussian shape of the pulse). Hence the measured values of 11.4, 12, 9.2 and 14.8 μs correspond to 247, 260, 200 and 321 fs, respectively.

Figure 4A:
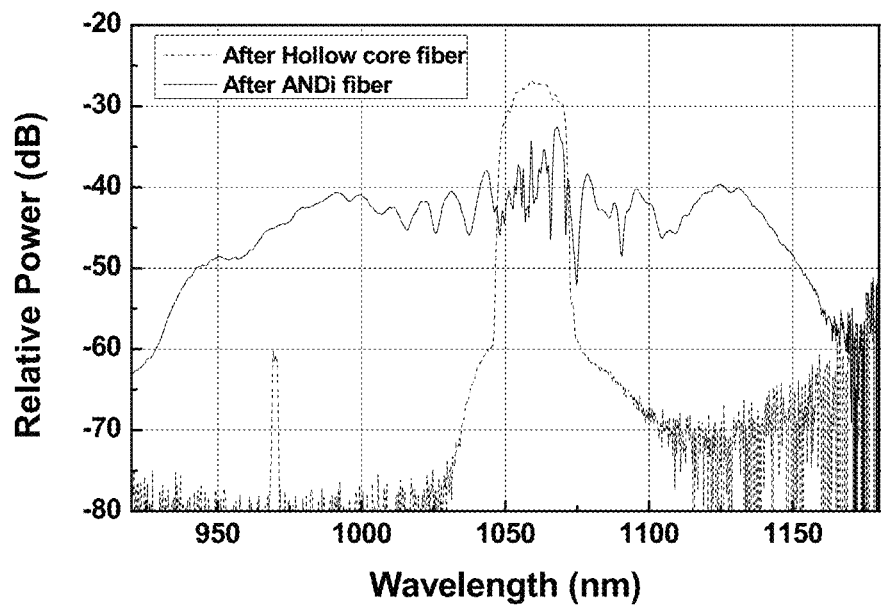
FIG. 4A illustrates the optical spectra of the pulsed signal at the output of the hollow core (dashed line) and at the output of the ANDi microstructured fiber (continuous line), both at the same pump current, $I_{pump}=3$ A.
Figure 4B:
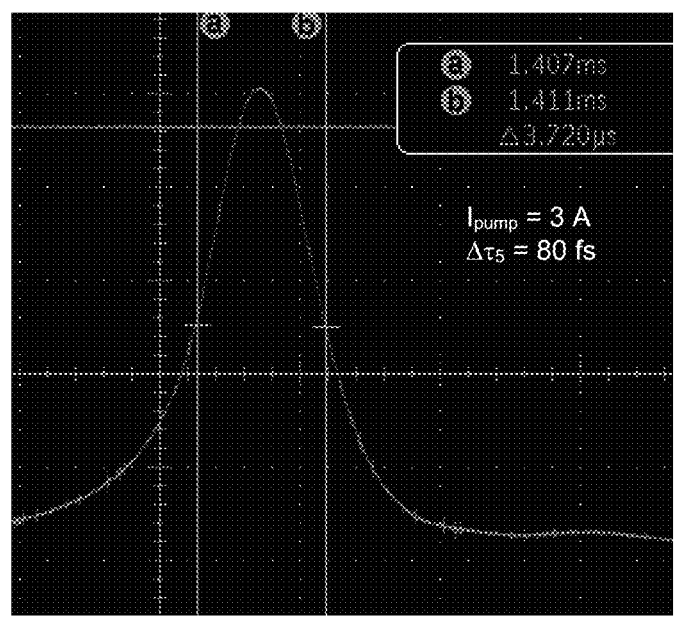
FIG. 4B illustrates the autocorrelation trace of the pulsed signal at the output of the ANDi microstructured fiber at $I_{pump}=3$ A.

FIG. 4A shows the optical spectrum of the pulsed signal at the fiber output of the spectrum broadening section 150 (i.e. at the output of the ANDi microstructured fiber 151), compared to the optical spectrum at the fiber output of the previous section (i.e. at the output of the hollow core fiber 141), both at the same pump current, $I_{pump}$=3 A. As a consequence of the nonlinear effect of SPM suffered by the pulsed signal, its optical spectrum at FWHM is broadened from 14.5 nm to 150 nm. The ANDi microstructured fiber 151 is excited at a central wavelength of 1060 nm, which corresponds to the center of the flattened top of the convex dispersion curve of the fiber. Since this dispersion curve is symmetric (when referenced to said central wavelength), the shape of the broadened spectrum is also symmetric. The pulse temporal width decreases from 200 fs to 80 fs and the pulse peak intensity increases from 45 GW/cm$^2$ to 439 GW/cm$^2$. FIG. 4B shows the autocorrelation trace of the pulsed signal at the output of the ANDi microstructured fiber 151, corresponding to the broadened spectrum of FIG. 4A.

Figure 5:
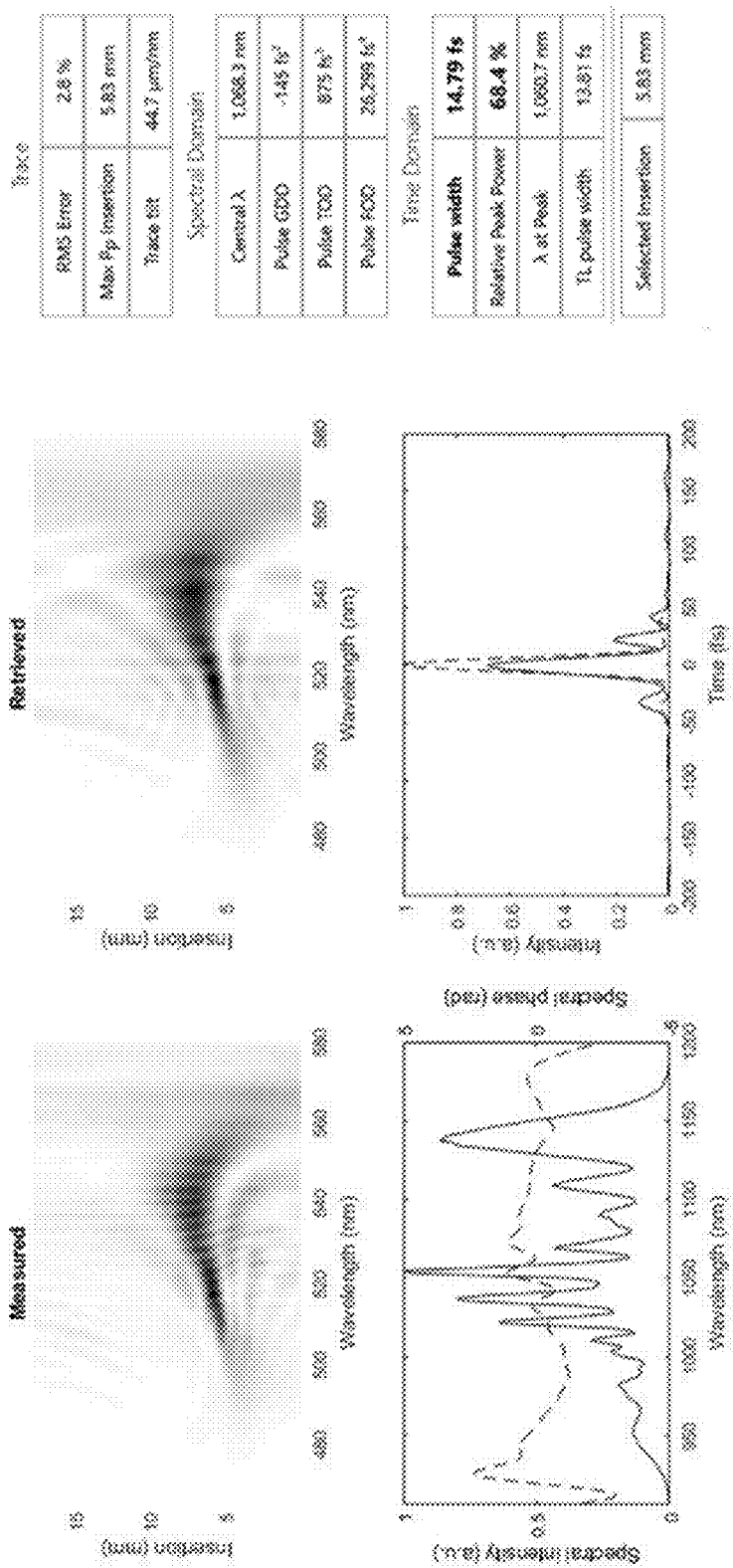
FIG. 5 illustrates the second harmonic generation d-scan retrieval and resulting pulse in the spectral and time domain after the section of free-space compression. Top left image corresponds to the measured, calibrated d-scan trace; Top right image corresponds to the retrieved d-scan trace; Bottom left image shows in solid line the measured linear spectrum and in dashed line the retrieved spectral phase; Bottom right image shows in dashed line the temporal intensity profile of the transform limited pulse and in solid line the temporal intensity profile of the measured pulse.

The cited variable compressor 160 of variable anomalous GDD can compress the pulses down to a temporal pulse width of 14.8 fs. FIG. 5 shows the results of one of the techniques that have been used to measure the properties of the compressed pulses at the output of the variable compressor 160. Known as d-scan technique, it is based on performing a dispersion scan to the pulses with a pulse compressor while measuring the spectrum of the resulting second-harmonic (SH) signal [4]. The variable compressor 160 is designed to provide a range of scan of negative dispersion from 0 to −4000 fs$^2$ and a range of scan of normal dispersion from 0 to 2500 fs$^2$. From this measurement, the phase and the amplitude properties of the electric field of the pulses are retrieved. The system presents very low GDD and TOD values (−154 fs$^2$ and 876 fs$^3$, respectively) providing a pulse with 68.4% of the energy in the main peak. The measured pulse width is 14.8 fs. This result demonstrates the high degree of temporal coherence of the pulsed signal, since it is very close to the Fourier limit duration supported by its optical spectrum: 13.8 fs.

As known in the field, the shortest temporal width achievable after compression of an optical pulse is the value corresponding to the Fourier limit supported by its spectrum. In this particular embodiment a FWHM temporal pulse width of $\Delta\tau_6$=14.8 fs has been measured, while the FWHM Fourier limit of its spectrum is 13.8 fs. The observation of such a high compressibility of the pulse(s) at the output of the spectrum broadening section 150 further demonstrates that:

The pulse(s) suffers very low third-order dispersion while being spectrally broadened at the ANDi fiber, since it is properly compressed by a free-space compressor with negligible third-order dispersion. Third-order dispersion (TOD) suffered by the pulse is as low as 875 fs$^3$ according to measurement shown in FIG. 5. This effect results from the flatness of the dispersion curve of the ANDi fiber (FIG. 9B).

The degree of spectral coherence of the pulses at the fiber output of the spectrum broadening section 150 is very high, being pulse-to-pulse fluctuations of amplitude and phase very low. In this particular embodiment, the modulus of the complex degree of first-order coherence of the electric field of the train of pulses, $|g_{12}^{(1)}(\lambda)|$, as defined in [5], is calculated higher than 0.95 at all spectral locations within the emission spectral range of the train of pulses at the fiber output of the spectrum broadening section 150, in correspondence with the theoretical description of pulse dynamics in ANDi fibers taught in [6], section 3, FIGS. 2, 3, for the case of exciting input pulses of duration of 200 fs or below. Said emission spectral range is to be understood as the spectral range comprised between the two most extreme wavelengths of the spectrum where the relative power is at least about 10% of the maximum relative power. Accordingly, in the particular case of the supercontinuum spectrum shown in FIG. 4A, said spectral range is comprised between 975 and 1140 nm. Said high degree of coherence is also confirmed by the autocorrelation trace of FIG. 6B. As taught by Runge et al in [7], FIG. 1, in the autocorrelation technique, a pulse train instability (low degree of coherence) is reflected in a narrow spike at the center of the autocorrelation signal, with a broad smooth pedestal that can mislead to a wrong pulse duration value. While a very stable pulse train (high degree of coherence) is characterized by a structured trace without broad pedestal, as it is the case of the autocorrelation trace of FIG. 6B.

Figure 6A:
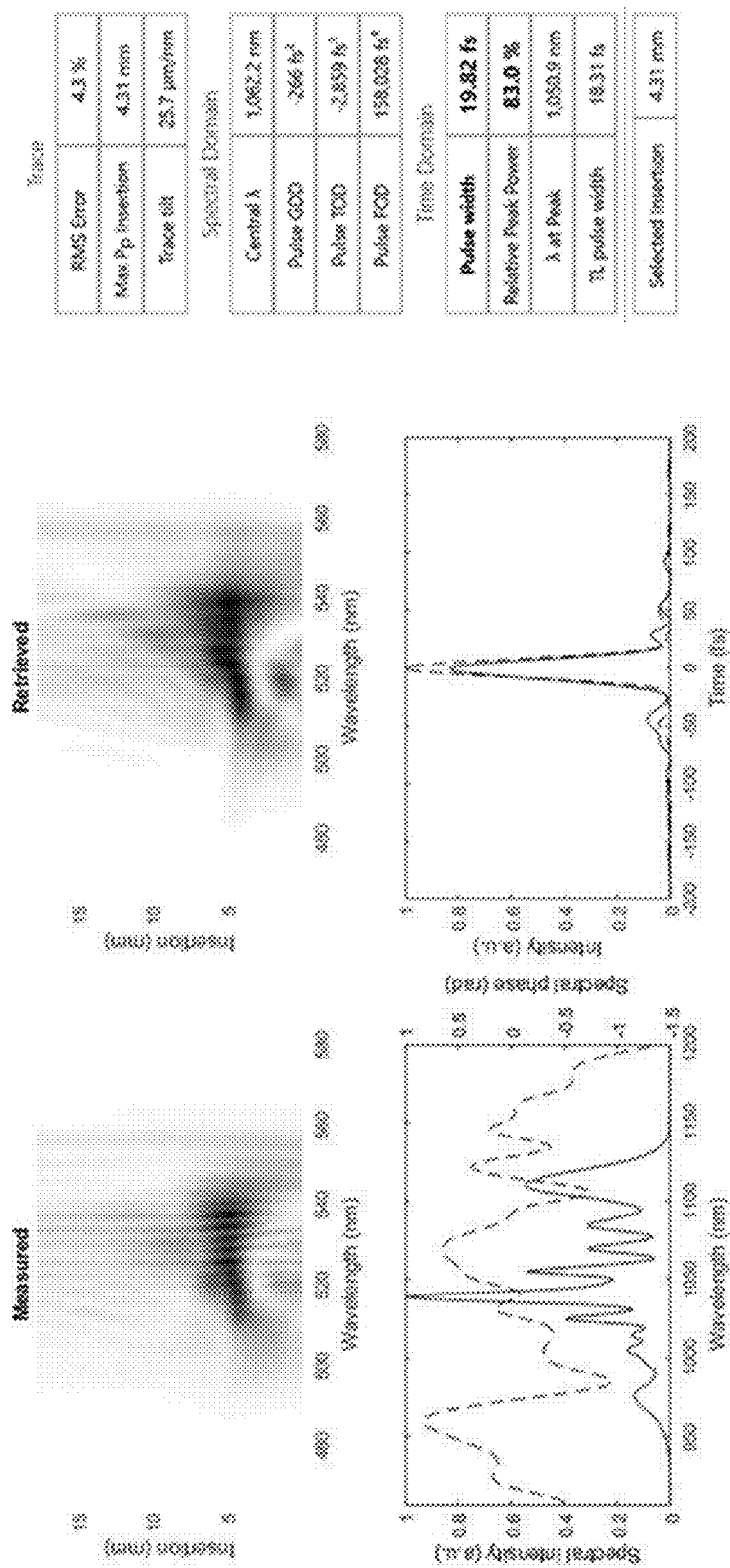
FIG. 6A illustrates independent measurements of the properties of the pulsed signal after section of free-space compression with two different techniques where
Figure 6B:
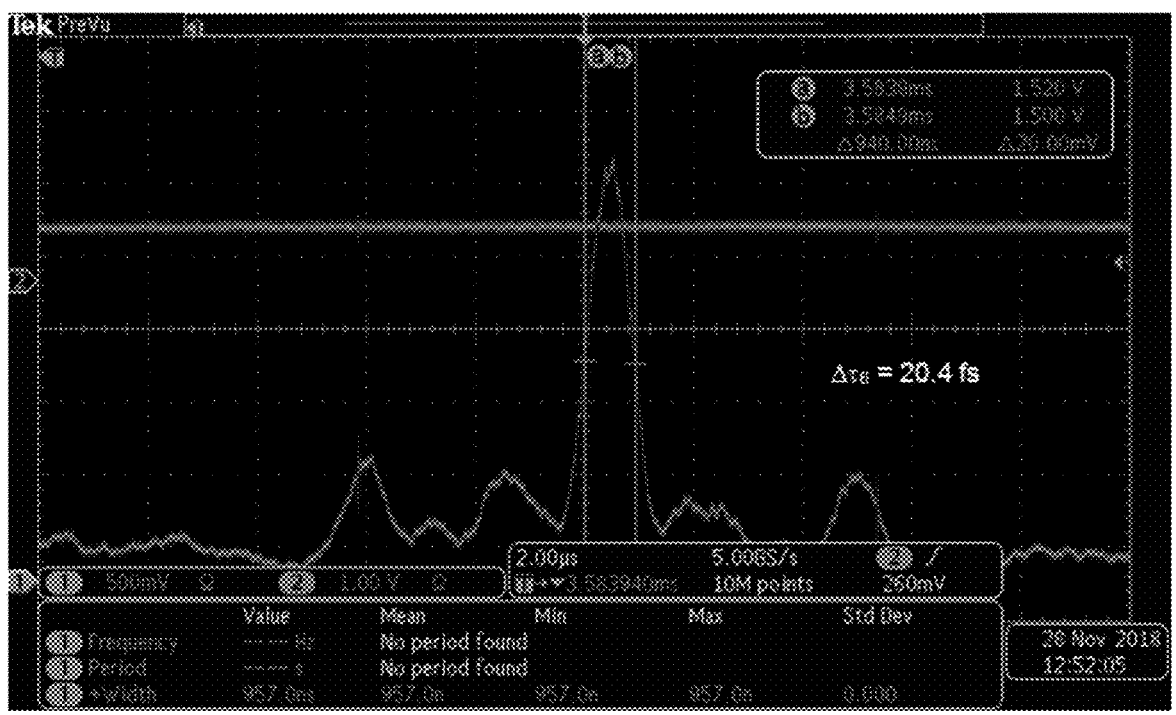
FIG. 6B illustrates independent measurements of the properties of the pulsed signal after section of free-space compression with two different techniques with an autocorrelation measurement and the pulse width measurement result obtained in FIG. 6B is 20.40 fs.

To further confirm that the pulse is temporally coherent (thus compressible to close to its Fourier transform limit), two different methods of measurement were compared: d-scan and autocorrelation. FIGS. 6A and 6B show the results of d-scan and autocorrelation measurements, respectively, with the pulse compressed by the same variable dispersion compressor and the same dispersion range. Both methods gave the same independent result of 20±1 fs pulse width.

With reference to FIG. 7, therein it is illustrated a second embodiment of the proposed all-fiber configuration system.

According to this second embodiment, a fiber laser seed source 210 is configured to produce/deliver short pulses at high repetition rate. At an output of the fiber laser seed source 210 the optical properties of the pulse(s) are the following: Spectral bandwidth (at Full Width Half Maximum, FWHM) $\Delta\lambda_1$=13.6 nm; Temporal pulse width (at FWHM) $\Delta\tau_1$=3.1 ps; Peak Power $P_{p1}$=86 W; Central wavelength=1060 nm; Pulse repetition rate=75 MHz. The central wavelength and the pulse repetition rate remain unchanged throughout all the sections of the all-fiber system.

The fiber output of the fiber laser seed source 210 is coupled to a fiber input of next section (stretching section 220) via a fused fiber splice 215.

The stretching section 220 in this second embodiment comprises a hollow core microstructured fiber 221 with anomalous group delay dispersion (i.e. GDD<0) and particularly a total length of 6 m and a mode field diameter of 7.2 μm. The function of the stretching section 220 is to stretch the pulse(s) temporally. The length of this hollow core microstructured fiber 221 is designed so that it pre-compensates the normal GDD accumulated in next sections 225, 230, 250 so that the net GDD suffered by the pulse(s)

from the output of the fiber laser seed pulse 210 is 0 in a point of the first segment of the ANDi microstructured fiber 251. Doing so, the efficiency of the spectral broadening suffered by the pulse(s) by SPM inside the spectrum broadening section 250 is optimized, since the maximum peak power is actually achieved in such point inside the ANDi microstructured fiber 251. At the fiber output of the stretching section 220 the optical properties of the pulse(s) are the following: FWHM spectral bandwidth $\Delta\lambda_2$=13.6 nm; FWHM temporal pulse width $\Delta\tau_2$=1.8 ps; Peak Power $P_{p2}$=74 W; Peak Intensity $I_{p2}$=245 MW/cm$^2$.

In this second embodiment, section 225 comprises a fused fiber combiner 222 that launches light from a laser diode 223 into an active optical fiber 231, doped with a rare earth element, of the amplification section 230. The fibers of this section 225 through which the pulse(s) propagate/propagates particularly have a total length of 2 m and normal group delay dispersion (i.e. GDD>0). Therefore the pulse(s) suffer temporal compression. At the fiber output of section 225 the optical properties of the pulse(s) are the following: FWHM spectral bandwidth $\Delta\lambda_3$=13.6 nm; FWHM temporal pulse width $\Delta\tau_3$=1.6 ps; Peak Power $P_{p3}$=83 W; Peak Intensity $I_{p3}$=276 MW/cm$^2$.

The amplification section 230 of this second embodiment particularly comprises a double clad ytterbium doped active fiber 231, with normal group delay dispersion (i.e. GDD>0), with a total length of 5 m. It should be noted that the rare earth element of the active optical fiber 231 in other embodiments could comprise other lanthanides or rare-earth elements such as the ones described above for the first embodiment, among others. Unlike the first embodiment, where temporal stretching in the stretching section 120 is produced by a GDD of same sign that the sign of GDD in the amplifying section 130 (both normal, GDD>0), in this second embodiment the GDD of the stretching section 220 is anomalous (GDD<0), while the GDD of the amplifying section 230 is normal (GDD>0). Consequently, in this second embodiment, the pulse(s) going through the amplification section 230 is/are compressed and amplified progressively and simultaneously. In this process the peak power of the pulse(s) progressively reaches and exceeds the threshold to generate a seminal spectral broadening by SPM non-linear effect, as illustrated in FIG. 7 (reference to 3, 4 and 4b). The amplification section 230 provides the peak power required at the input of next section to efficiently generate ultrabroad temporally coherent spectral broadening in the ANDi microstructured fiber 251. At the fiber output of the amplification section 230 the optical properties of the pulse(s) are the following: FWHM spectral bandwidth $\Delta\lambda_{4b}$=20 nm; FWHM temporal pulse width $\Delta\tau_{4b}$=2.0 ps; Average Power $P_{4b}$=0.7 W; Peak Power $P_{p4b}$=4.67 kW; Peak Intensity $I_{p4b}$=15.6 GW/cm$^2$.

The fiber output of the amplification section 230 is coupled to the fiber input of next section (spectrum broadening section 250) via a specially designed fiber transition 216, as it will be detailed below.

The spectrum broadening section 250 and the elements coupled to the latter do not differ in any significant aspect from the explanations given for the first embodiment.

In this second embodiment, at the fiber output of the spectrum broadening section 250 the optical properties of the pulse(s) are the following: FWHM spectral bandwidth $\Delta\lambda_5$=60 nm; FWHM temporal pulse width $\Delta\tau_5$=4.0 ps; Average Power $P_5$=0.5 W; Peak Power $P_{p5}$=1.67 kW; Peak Intensity $I_{p5}$=31.4 GW/cm$^2$.

Figure 8A:
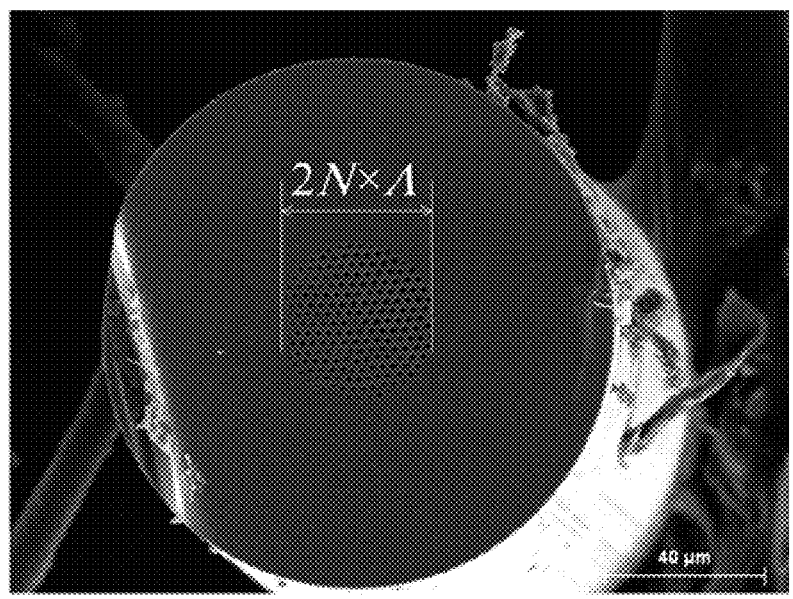
FIG. 8A is an image of a representative microstructured fiber, indicating the parameter N that defines the size of the microstructure.
Figure 8B:
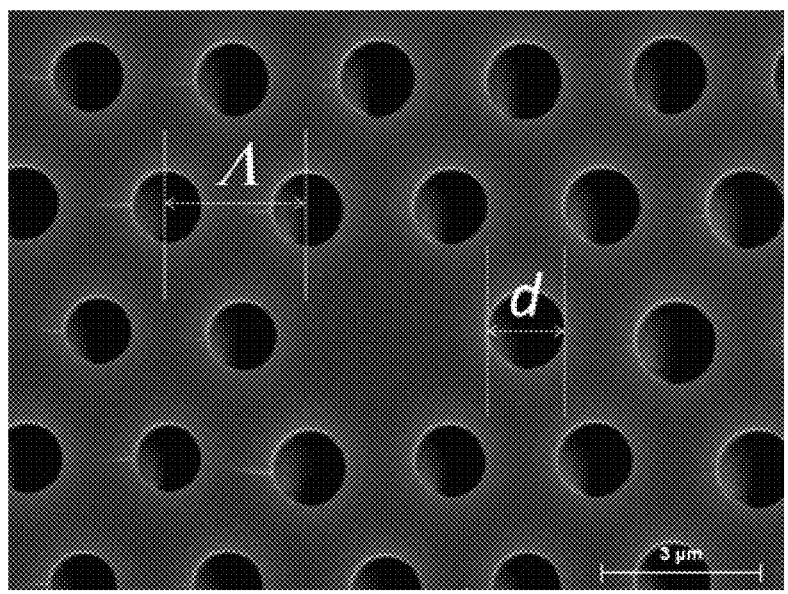
FIG. 8B shows the detail of the microstructure of air holes of the fiber around the core of the fiber, indicating geometrical parameters Λ (pitch) and d (hole diameter).

According to the proposed invention, the cited ANDi microstructured fibers 151, 251 are manufactured with silica. They present a periodic microstructure of air holes of triangular type. The core of the fibers is solid, created by the absence of one air hole in the center of the microstructure. The air holes have a diameter d. The centers of neighbor air holes are separated a period $\Lambda$ (also called pitch). The microstructure of air holes has a diameter of 2N periods, i.e. the core has N air holes at each side. The microstructure of air holes is surrounded by a jacket of uniform silica that confers the fiber a typical diameter of 125 μm. FIGS. 8A and 8B permit a graphical identification of the aforementioned parameters.

The wavelength dependence of the chromatic dispersion (dispersion curve) suffered by the light in its propagation inside the ANDi microstructured fibers 151, 251 is determined by the parameters $\Lambda$ and d. In the present invention, in order to limit nonlinear effects to SPM, the chromatic dispersion of this ANDi microstructured fibers 151, 251 has to be normal within a very broad spectral band (>300 nm). As well, the chromatic dispersion has to be very close to 0 within said spectral band, in order to limit pulse temporal stretching as much as possible. Besides, its dispersion curve has to present a quasi-flat, convex and symmetric shape (referenced to the central wavelength of the exciting optical signal) in order to generate symmetric spectral broadening by SPM. Taking 1060 nm as central wavelength, such properties of the dispersion curve are obtained combining the values of $\Lambda$ and d within the following ranges: $\Lambda \in$[0.55; 0.65]μm; d$\in$[1.50; 1.70]μm. Efficient confinement of the light inside the core is obtained by values of N equal to 7 or higher.

Figure 9A:
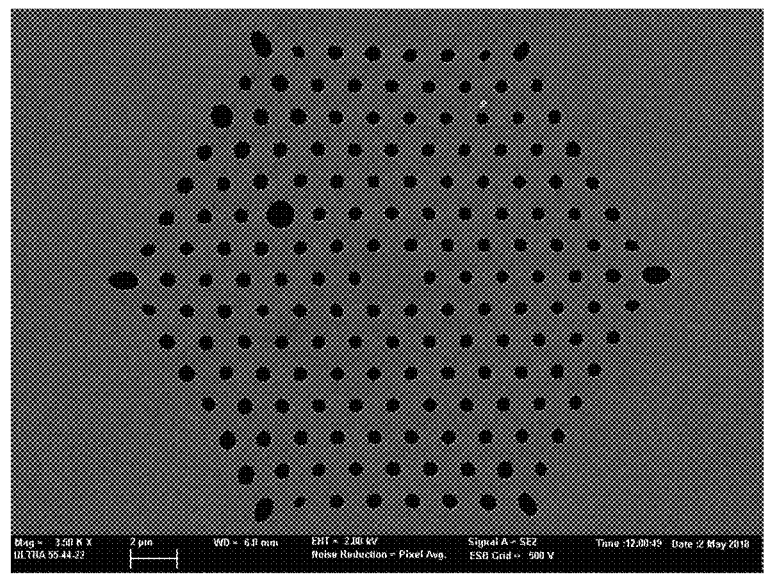
FIG. 9A illustrates some properties of an example of ANDi microstructured fiber used in present invention, such as a microscopic image of the transversal section of the ANDi microstructured fiber, with an average hole diameter d=0.61 μm and an average pitch Λ=1.67 μm.
Figure 9B:
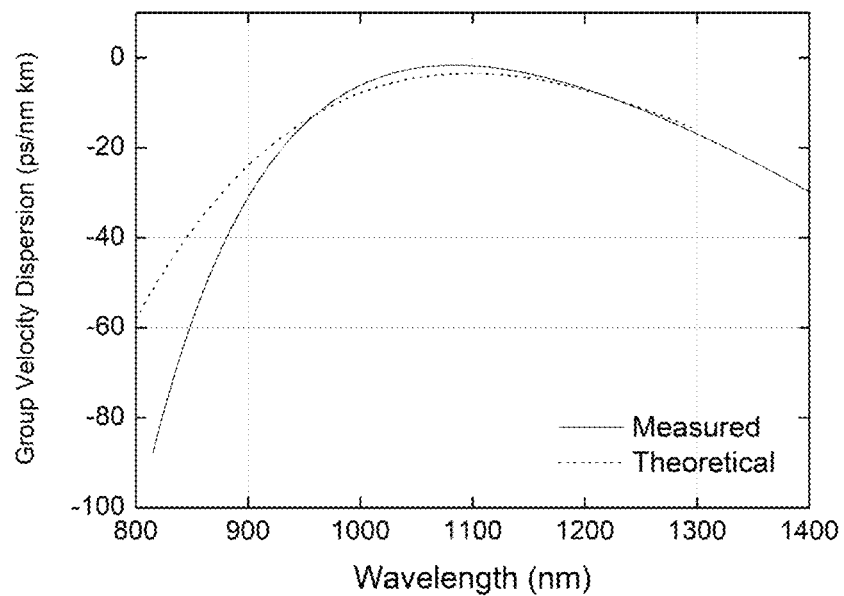
FIG. 9B illustrates some properties of an example of ANDi microstructured fiber used in present invention such as the theoretical and measured dispersion curve of the fiber.

FIG. 9A shows a microscopic image of the transversal section of an example of ANDi microstructured fiber used in this invention, which presents an average hole diameter d=0.61 μm and an average pitch $\Lambda$=1.67 μm. FIG. 9B illustrates the theoretical and measured dispersion curve of such fiber. In the whole range of wavelengths of 1060±150 nm, group velocity dispersion is normal, lower than 0 ps/nm km and higher than −30 ps/nm km (which is equivalent to say higher than 0 fs$^2$/m and lower than 17.9×10$^3$ fs$^2$/m).

As explained before, a crucial issue to manufacture a completely monolithic all-fiber temporally coherent supercontinuum source is to couple efficiently the light from the output of the compressing section 140, 230 to the input of the ANDi microstructured fiber 151, 251 through an optical fiber transition 116, 216. The challenge is to obtain a coupling efficiency high enough to avoid thermal damage in the fiber transition 116, 216 while maintaining the temporal coherence of the pulse(s). To solve this, the present invention provides an approach to couple with low insertion losses the light propagated inside an optical fiber with a given core diameter into the ANDi microstructured fiber 151, 251.

The approach relies on an optical transition between the two optical fibers that provides minimum insertion losses. This transition is made of a number of short sections of fibers with different fundamental mode size and numerical apertures, which are fusion spliced sequentially. The total insertion loss between the two fibers is obtained theoretically applying the equation of the coupling factor between fibers of different fundamental mode size. This design is then experimentally reproduced using sections of real optical fibers with fundamental mode sizes as close as possible to the ideal case.

Figure 10A:
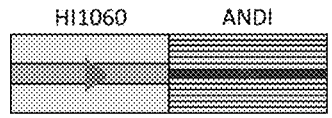
FIG. 10A is an example of optical fiber transitions to couple light between a HI1060 fiber and an ANDi microstructured fiber.
Figure 10B:
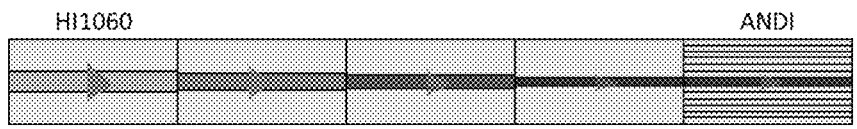
FIG. 10B is an example of optical fiber transitions to couple light between a HI1060 fiber and an ANDi microstructured fiber.

An example of embodiment of a fiber transition design and its experimental reproduction follows. FIG. 10A illustrates a direct fusion splicing transition between a standard single-mode fiber at 1060 nm (e.g. HI1060 from Corning, of fundamental mode field radius 3.1 μm) and an ANDi microstructured fiber, of fundamental mode field radius 1.25 μm. Since the difference between their modal radius is high, the coupling factor between them is expected to be low and consequently with high insertion losses. FIG. 10B illustrates a smoother transition, made of short sections of fibers with decreasing size of field mode radius and increasing numerical aperture. This configuration is expected to provide a higher power coupling efficiency between the HI1060 fiber and the ANDi microstructured fiber.

The power coupling factor σ between two fundamental modes of different size is given by the equation $$\sigma = \frac{\left|\int E_1^* \cdot E_2 dA\right|^2}{\int |E_1|^2 dA \cdot \int |E_2|^2 dA}; \sigma = \frac{4 \cdot \omega_1^2 \cdot \omega_2^2}{(\omega_1^2 + \omega_2^2)^2} \quad (1)$$

where $\omega_1$ and $\omega_2$ are the fundamental mode field radii of the fibers to be coupled at a given wavelength (e.g. 1060 nm in this example of embodiment).

For the case of the direct fusion splice transition of FIG. 10A the theoretical coupling factor is σ=0.481. This coupling factor is enhanced to σ=0.755 if a fiber transition of the type of FIG. 10B is set up, using short pieces of Corning HI980 fiber and Thorlabs UHNA1 fiber, sequentially, between HI1060 fiber and ANDi microstructured fiber, being their mode field radii as follows:

Corning HI1060: $\omega_1$=3.1 μm
Corning HI980: $\omega_2$=2.1 μm
Thorlabs UHNA1: $\omega_3$=1.6 μm
ANDi microstructured fiber: $\omega_4$=1.25 μm
Thus σ=0.862*0.93*0.942=0.755.

This result is confirmed experimentally, obtaining an experimental coupling factor σ=0.81, hence obtaining a total power insertion loss of less than 20% between the HI1060 fiber and the ANDi microstructured fiber.

It is also important to note that the procedure of the proposed fused fiber splices between sections of the fiber transition includes a step of optimization of the insertion losses inherent to the refractive index mismatching in the interface between sections. This procedure consists of applying a number of extra arc fusion discharges after the first arc discharge that originally fuses one section of fiber to the next. These extra arc discharges provide higher homogeneity of the glass in the fusion transition, hence less optical losses due to index mismatching. The number of extra arc discharges ranges from 1 to 100. For each transition at least the following parameters of the extra arc discharges are experimentally determined: prefuse power, prefuse time, arc power, arc time, and position of the extra arc discharge in the fiber transition.

For the peak powers obtained at the output of the fiber section previous to the spectrum broadening section 150, 250 in the different embodiments of the all-fiber system, it has been determined experimentally that the coupling efficiency of the coupling transition to the ANDi microstructured fiber 151, 251 has to be higher than 60% (σ>0.6) in order to obtain temporally coherent compressible pulses of up to 150 nm full width half maximum bandwidth or higher by the SPM nonlinear effect, while avoiding thermal damage and maintaining the temporal coherence of the pulse in the fiber transition.

This approach has been used to design and implement transitions from the compressing section 140, 230 to the spectrum broadening section 150, 250. In the first embodiment (FIG. 2) the transition is performed between the hollow core microstructured fiber 151 with 7.2 μm mode field diameter to the ANDi microstructured fiber 151 with 2.6 μm mode field diameter. The resulting coupling factor σ is 0.6 or higher. In the second embodiment (FIG. 7), the transition is performed between a Corning HI1060 single mode fiber 231 with 6.2 μm mode field diameter to the ANDi microstructured fiber 251 with 2.6 μm mode field diameter. The resulting coupling factor σ is 0.8 or higher.

Figure 11:
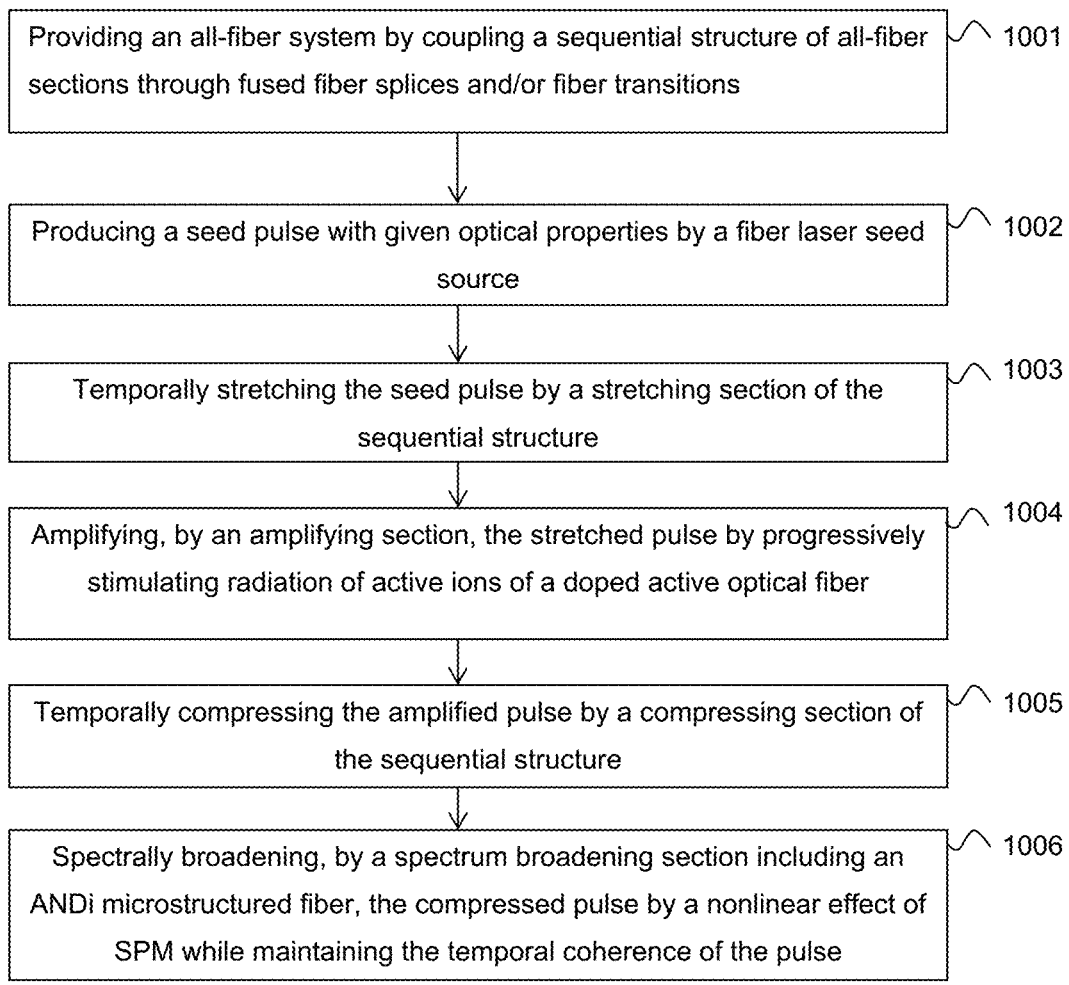
FIG. 11 is a flow chart illustrating a method for generating temporally coherent supercontinuum pulsed emission, according to an embodiment of the present invention.

With reference to FIG. 11, therein it is illustrated an embodiment of the proposed method. According to this embodiment, the method comprises, at step 1001, providing an all-fiber system by coupling a sequential structure of all-fiber sections through fused fiber splices 115, 215 and/or fiber transitions 116, 216. At step 1002, a fiber laser seed source 110, 210 produces a seed pulse with given optical properties (for example, a spectral bandwidth with a Fourier transform limited temporal pulse width of 1 picosecond or below at FWHM. At step 1003, the seed pulse is stretched temporally. Then, at step 1004, the stretched pulse is amplified by progressively stimulating radiation of active ions of a doped active optical fiber 131, 231 (particularly an ytterbium doped active fiber). At step 1005, the amplified pulse is temporally compressed. Finally, at step 1006, the compressed pulse is spectrally broadened, particularly via an ANDi microstructured fiber 151, 251 by a nonlinear effect of SPM while maintaining the temporal coherence of the pulse. Hence, the pulse at an output of the ANDi microstructured fiber 151, 251 has a FWHM spectral bandwidth of 60 nanometers or more, and is compressible down to a pulse width corresponding to the Fourier limit of its spectral bandwidth.

In an embodiment, the following optical properties of the pulse at said output of the ANDi microstructured fiber 151, 251 are obtained: central wavelength of emission=1060 nm; FWHM spectral bandwidth=150 nm; Average Power=0.14 W and Peak Intensity=439 GW/cm², and wherein the temporal coherence of the pulse at the output of the spectrum broadening section is demonstrated by actually compressing the pulse down to a temporal pulse width of 14.8 fs.

While the foregoing is directed to embodiments of the present invention, other and further embodiments of the invention may be devised without departing from the basic scope thereof.

The scope of the present invention is defined in the following set of claims.

The invention claimed is:

1. A system comprising:
 a sequential structure of all-fiber sections coupled through fused fiber splices, the all-fiber sections including, in the following order:
 a fiber laser seed source configured to produce at least one seed pulse with given optical properties including a central wavelength, a repetition rate, and a spectral bandwidth that corresponds to a Fourier transform limited temporal pulse width of 1 picosecond or below at Full Width Half Maximum (FWHM);
 a stretching section including an optical fiber configured to temporally stretch the at least one seed pulse;
 an amplification section including an active optical fiber, doped with a rare earth element, configured to amplify the stretched pulse by progressively stimulating radiation of active ions of the active optical fiber;
 a compressing section configured to temporally compress the amplified pulse; and
 a spectrum broadening section including a single-mode all normal dispersion (ANDi) microstructured fiber that spectrally broadens the compressed pulse by a nonlinear effect of Self Phase Modulation (SPM) while maintaining a temporal coherence of the pulse, such that the broadened pulse at an output of the spectrum broadening section has a FWHM spectral bandwidth of 60 nanometers or more, and is compressible down to a temporal pulse width corresponding to a Fourier limit of its spectral bandwidth, wherein the central wavelength and the repetition rate of the pulse remain unchanged throughout all the all-fiber sections of the system.

2. The system of claim 1, wherein the stretching section further comprises a fused fiber combiner configured to further receive light from a laser diode and launch the received light to the amplification section, the optical fiber of the stretching section being a single mode optical fiber having normal group delay dispersion.

3. The system of claim 1, wherein said rare earth element comprises ytterbium, and wherein the active optical fiber has normal group delay dispersion.

4. The system of claim 1, wherein the compressing section comprises
a hollow core microstructured fiber having anomalous group delay dispersion.

5. The system of claim 1, wherein the optical fiber of the stretching section comprises a hollow core microstructured fiber having anomalous group delay dispersion, the system further comprising
a fused fiber combiner configured to further receive light from a laser diode and to launch the received light to the active optical fiber.

6. The system of claim 5, wherein the rare earth element comprises ytterbium, and wherein the active optical fiber has normal group delay dispersion.

7. The system of claim 1, wherein the compressing section and the amplification section are provided by said active optical fiber.

8. The system of claim 1, wherein the compressing section is coupled to the spectrum broadening section via a fiber transition, the fiber transition comprising a number of pieces of fibers of different fundamental mode field sizes designed to provide a total power coupling efficiency between the compressing section and the spectrum broadening section over 60%.

9. The system of claim 1, wherein the ANDi microstructured fiber has a length of 1 meter or less, a normal group delay dispersion and a normal group velocity dispersion, said group velocity dispersion being lower than 0 ps/nm/km and higher than −30 ps/nm/km in the whole range of wavelengths comprised within ±150 nm of the central wavelength of the fiber laser seed source.

10. The system of claim 1, wherein an average power of the amplified pulse at an output of the amplification section is equal to or greater than 0.4 W, an average power of the compressed pulse at an output of the compressing section is equal to or greater than 0.3 W and an average power of the broadened pulse at said output of the spectrum broadening section is equal to or greater than 100 mW.

11. The system of claim 1, wherein a peak intensity of the compressed pulse at an input of the ANDi microstructured fiber is equal to or greater than 60 GW/cm$^2$.

12. The system of claim 1, wherein all the optical fibers of the all-fiber sections are polarization maintaining fibers.

13. The system of claim 1, further comprising
a fiber isolator positioned between at least two of the all-fiber sections.

14. A method for generating temporally coherent supercontinuum pulsed emission, comprising:
providing an all-fiber system by coupling a sequential structure of all-fiber sections through fused fiber splices;
producing, by a fiber laser seed source of said sequential structure, at least one seed pulse with given optical properties including a central wavelength, a repetition rate, and a spectral bandwidth that corresponds to a Fourier transform limited pulse width of 1 picosecond or below at Full Width Half Maximum (FWHM);
temporally stretching the at least one seed pulse by a stretching section of said sequential structure, said stretching section including an optical fiber;
amplifying, by an amplification section of the sequential structure, the stretched pulse by progressively stimulating radiation of active ions of an active optical fiber, doped with a rare earth element and included in said amplification section;
temporally compressing the amplified pulse by a compressing section of the sequential structure; and
spectrally broadening, by a spectrum broadening section including a single-mode all normal dispersion (ANDi) microstructured fiber, the compressed pulse by a nonlinear effect of Self Phase Modulation (SPM) while maintaining a temporal coherence of the pulse, such that the broadened pulse at an output of the spectrum broadening section has a FWHM spectral bandwidth of 60 nanometers or more, and is compressible down to a temporal pulse width corresponding to a Fourier limit of its spectral bandwidth, wherein the central wavelength and the repetition rate of the pulse remain unchanged throughout all the sections of the all-fiber system.

15. The method of claim 14, wherein the amplifying of the stretched pulse is performed independently of the pulse compression, the active optical fiber comprising an ytterbium doped active fiber having normal group delay dispersion and the pulse compression being performed via a hollow core microstructured fiber having anomalous group delay dispersion.

16. The method of claim 14, wherein both the amplifying and the temporal compressing of the pulse are performed via said active optical fiber comprising an ytterbium doped active fiber having normal group delay dispersion.

17. A method for generating temporally coherent supercontinuum pulsed emission, comprising:
providing an all-fiber system by coupling a sequential structure of all-fiber sections through fused fiber splices;
producing, by a fiber laser seed source of said sequential structure, at least one seed pulse with given optical properties including a central wavelength, a repetition rate, and a spectral bandwidth that corresponds to a Fourier transform limited pulse width of 1 picosecond or below at Full Width Half Maximum (FWHM);
temporally stretching the at least one seed pulse by a stretching section of said sequential structure, said stretching section including an optical fiber;
amplifying, by an amplification section of the sequential structure, the stretched pulse by progressively stimulating radiation of active ions of an active optical fiber, doped with a rare earth element and included in said amplification section;
temporally compressing the amplified pulse by a compressing section of the sequential structure; and spectrally broadening, by a spectrum broadening section including a single-mode all normal dispersion (ANDi) microstructured fiber, the compressed pulse by a nonlinear effect of Self Phase Modulation (SPM) while maintaining a temporal coherence of the pulse, such that the broadened pulse at an output of the spectrum broadening section has a FWHM spectral bandwidth of 60 nanometers or more, and is compressible down to a temporal pulse width corresponding to a Fourier limit of its spectral bandwidth, wherein the compressing section comprises a hollow core microstructured fiber having anomalous group delay dispersion, wherein the central wavelength and the repetition rate of the pulse remain unchanged throughout all the sections of the all-fiber system.

18. An all-fiber configuration system for generating temporally coherent supercontinuum pulsed emission, comprising:

a sequential structure of all-fiber sections coupled through fused fiber splices, the all-fiber sections including, in the following order:
a fiber laser seed source configured to produce at least one seed pulse with given optical properties including a central wavelength, a repetition rate, and a spectral bandwidth that corresponds to a Fourier transform limited temporal pulse width of 1 picosecond or below at Full Width Half Maximum (FWHM);
a stretching section including an optical fiber configured to temporally stretch the at least one seed pulse;
an amplification section including an active optical fiber, doped with a rare earth element, configured to amplify the stretched pulse by progressively stimulating radiation of active ions of the active optical fiber;
a compressing section configured to temporally compress the amplified pulse; and
a spectrum broadening section including a single-mode all normal dispersion (ANDi) microstructured fiber that spectrally broadens the compressed pulse by a nonlinear effect of Self Phase Modulation (SPM) while maintaining a temporal coherence of the broadened pulse, such that the broadened pulse at an output of the spectrum broadening section has a FWHM spectral bandwidth of 60 nanometers or more, and is compressible down to a temporal pulse width corresponding to a Fourier limit of its spectral bandwidth, wherein the rare earth element comprises ytterbium, the active optical fiber has a normal group delay dispersion, and the ANDi microstructured fiber has a length of 1 meter or less, a normal group delay dispersion, and a normal group velocity dispersion lower than 0 ps/nm/km and higher than −30 ps/nm/km in a whole range of wavelengths comprised within ±150 nm of the central wavelength of the fiber laser seed source, wherein the central wavelength and the repetition rate of the pulse remain unchanged throughout all the sections of the all-fiber system.

19. A method for generating temporally coherent supercontinuum pulsed emission, comprising:

providing an all-fiber system by coupling a sequential structure of all-fiber sections through fused fiber splices;
producing, by a fiber laser seed source of the sequential structure, at least one seed pulse with given optical properties including a central wavelength, a repetition rate, and a spectral bandwidth that corresponds to a Fourier transform limited pulse width of 1 picosecond or below at Full Width Half Maximum (FWHM);
temporally stretching the at least one seed pulse by a stretching section of the sequential structure, the stretching section including an optical fiber;
amplifying, by an amplification section of the sequential structure, the stretched pulse by progressively stimulating radiation of active ions of an active optical fiber, doped with a rare earth element and included in the amplification section;
temporally compressing the amplified pulse by a compressing section of the sequential structure; and
spectrally broadening, by a spectrum broadening section including a single-mode all normal dispersion (ANDi) microstructured fiber, the compressed pulse by a nonlinear effect of Self Phase Modulation (SPM) while maintaining a temporal coherence of the broadened pulse, such that the broadened pulse at an output of the spectrum broadening section has a FWHM spectral bandwidth of 60 nanometers or more, and is compressible down to a temporal pulse width corresponding to a Fourier limit of its spectral bandwidth, wherein the rare earth element comprises ytterbium, the active optical fiber has normal group delay dispersion, and the ANDi microstructured fiber has a length of 1 meter or less, a normal group delay dispersion, and a normal group velocity dispersion lower than 0 ps/nm/km and higher than −30 ps/nm/km in the whole range of wavelengths comprised within ±150 nm of the central wavelength of the fiber laser seed source, wherein the central wavelength and the repetition rate of the pulse remain unchanged throughout all the sections of the all-fiber system.

* * * * *